United States Patent [19]

Naruse

[11] Patent Number: 4,737,649

[45] Date of Patent: Apr. 12, 1988

[54] SHEET DISCRIMINATING APPARATUS WITH HOLE-DETECTING MEANS

[75] Inventor: Kazuaki Naruse, Kawasaki, Japan

[73] Assignee: Kabushiki Kaisha Toshiba, Kawasaki, Japan

[21] Appl. No.: 903,377

[22] Filed: Sep. 3, 1986

Related U.S. Application Data

[62] Division of Ser. No. 688,989, Jan. 4, 1985.

[30] Foreign Application Priority Data

| | | | |
|---|---|---|---|
| Jan. 11, 1984 | [JP] | Japan | 59-2047 |
| Jan. 11, 1984 | [JP] | Japan | 59-2049 |
| Feb. 7, 1984 | [JP] | Japan | 59-19333 |
| Feb. 7, 1984 | [JP] | Japan | 59-19334 |

[51] Int. Cl.[4] .................. G01N 21/88

[52] U.S. Cl. .................. 250/562; 356/430

[58] Field of Search .................. 250/559, 562, 563, 572, 250/556; 235/454; 356/71, 430, 431; 209/534

[56] References Cited

U.S. PATENT DOCUMENTS

| | | | |
|---|---|---|---|
| 4,189,235 | 2/1980 | Guter et al. | 250/562 |
| 4,352,988 | 10/1982 | Ishida | 250/559 |
| 4,429,991 | 2/1984 | Williams | 356/71 |
| 4,516,031 | 5/1985 | Kaule et al. | 209/534 |
| 4,587,434 | 5/1986 | Roes et al. | 250/556 |

FOREIGN PATENT DOCUMENTS

| | | |
|---|---|---|
| 859101 | 1/1961 | United Kingdom . |
| 963586 | 7/1964 | United Kingdom . |

*Primary Examiner*—David C. Nelms

*Assistant Examiner*—William L. Oer

*Attorney, Agent, or Firm*—Cushman, Darby & Cushman

[57] ABSTRACT

A sheet discriminating apparatus comprising means for detecting both light reflected by and light transmitted through a sheet, upon irradiation of light onto the sheet; hole-detecting means for detecting whether or not there is a hole in the sheet on the basis of an output of the light-detecting means, the hole detecting means generating a signal when a hole is detected in the sheet; means for gating the output of the light-detecting means in accordance with the hole signal; and means for detecting the degree of soiling of the sheet in accordance with an output of the gating means. During operation of the sheet discriminating apparatus, when excess light is detected by the light-detecting means, the hole-detecting means outputs a hole signal, and in response to the hole signal the gating means selectively gates the output of the light-detecting means to the means for detecting the degree of soiling. If there is no hole in the sheet, it is then judged whether or not the sheet is fit or unfit for continued use.

4 Claims, 2 Drawing Sheets

SHEET DISCRIMINATING APPARATUS WITH HOLE-DETECTING MEANS

This application is a division of application Ser. No. 688,989 filed Jan. 4, 1985.

BACKGROUND OF THE INVENTION

The present invention relates to a sheet discriminating apparatus, and more particularly to a bank note discriminating apparatus which is used in an automatic transaction apparatus or in an automatic classification/-collection apparatus capable of handling band notes for judging whether a bank note can be handled by such apparatuses by detecting whether a hole exists in the bank note.

In general, in a sheet discriminating apparatus which judges the degree of damage of a bank note by detecting soiling of the bank note, the amount of light transmitted through and/or the amount reflected is determined. Based on the measured values, the sheet discriminating apparatus detects the presence of soiling on the bank note. However, if the predetermined part of the bank note has a hole in it or if it is folded, the value of the transmission signal (which represents the amount of the transmission light) is large and quite variable, thereby distorting measurements. Further, if a bank note with a hole is examined by using light reflected from the bank note, the amount of light reflected is changed considerably.

SUMMARY OF THE INVENTION

It is, accordingly, the object of the present invention to provide a sheet discriminating apparatus which prevents an integrated value of the transmission or reflected light from varying greatly, in spite of the presence of a hole in the sheet, thereby permitting reliable detection of soiling.

The above object can be accomplished by a sheet discriminating apparatus which comprises: means for detecting both light reflected by and the light transmitted through a sheet, upon irradiation of light onto the sheet; hole-detecting means for detecting whether or not there is a hole in the sheet, on the basis of an output of the light-detecting means, the hole detecting means generating a signal when a hole is detected in the sheet; means for gating the output of the light-detecting means in accordance with the hole signal; and means for detecting the degree of soiling of the sheet in accordance with an output of the gating means.

DETAILED DESCRIPTION OF THE PREFERRED EMBODIMENTS

A bank note discriminating apparatus used as a sheet discriminating apparatus according to an embodiment will be described with reference to FIGS. 1 and 2. In the description to follow, sheets to be discriminated are bank notes.

Figure 1:
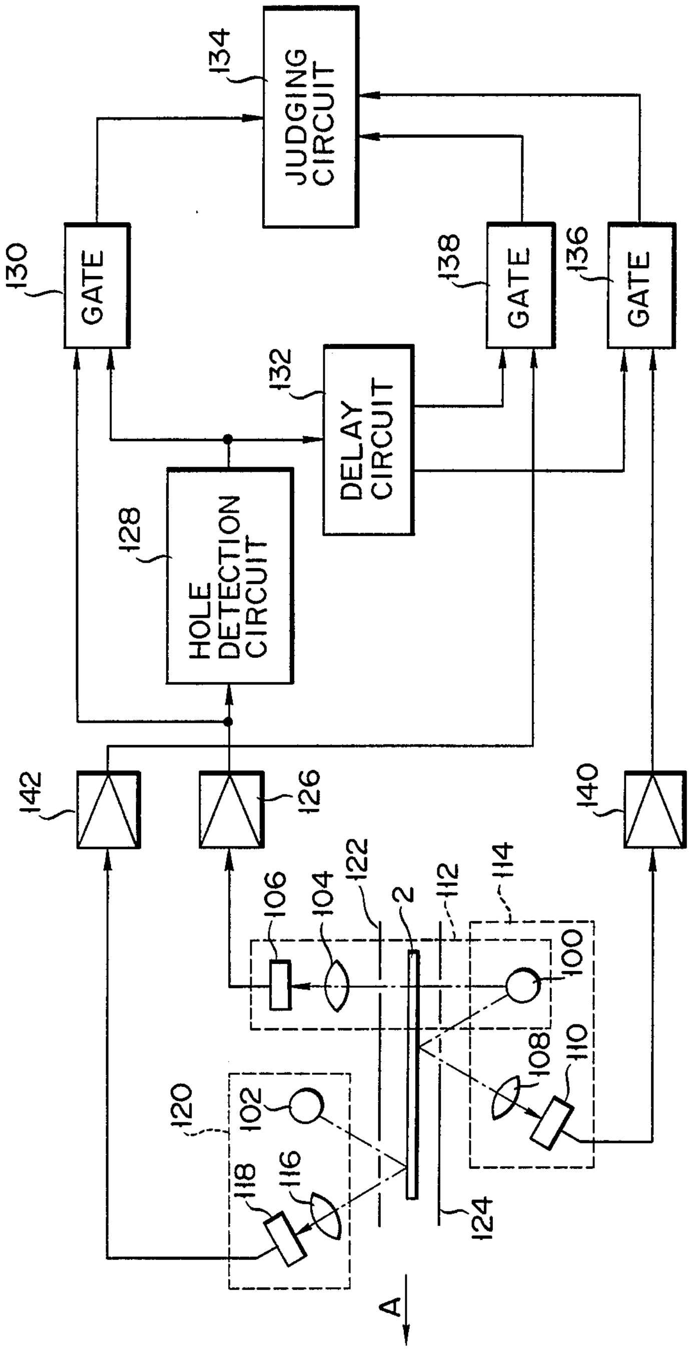
FIG. 1 is a block diagram of a bank note discriminating apparatus according to an embodiment of the present invention.
Figure 2:
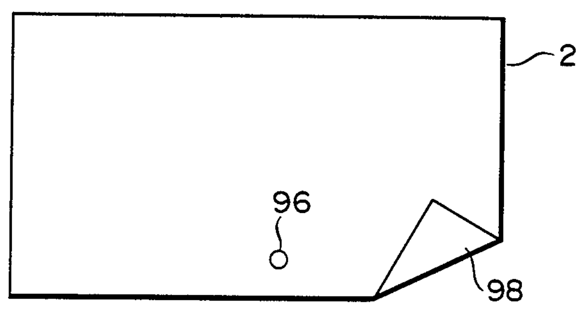
FIG. 2 is a plan view showing a bank note to be discriminated by the apparatus shown in FIG. 1.

FIG. 1 is a block diagram of an embodiment according to the present invention. Light sources 100 and 102 are arranged below and above the convey path along the convey direction. The light source 100 is located in front of the light source 102 along the convey direction. A lens 104 and a line sensor 106 are arranged immediately above the light source 100 through the convey path. Light emitted from the light source 100 and transmitted through the bank note 2 is incident on the line sensor 106 through the lens 104. A lens 108 and a line sensor 110 are also arranged in the vicinity of the light source 100 below the convey path. Light emitted from the light source 102 and reflected by the bank note 2 is incident on the line sensor 110 through the lens 108. The light source 100, the lens 104 and the line sensor 106 constitute a first detector 112. The light source 100, the lens 108 and the line sensor 110 constitute a second detector 114. A lens 116 and a line sensor 118 are arranged in the vicinity of the light source 102 above the convey path. Light emitted from the light source 102 and reflected by the bank note 2 is incident on the line sensor 118 through the lens 116. The light source 102, the lens 116 and the line sensor 118 constitute a third detector 120. Background plates 122 and 124 which have alternate black and white standard color stripes sandwiche the convey path.

An output from the first detector 112 is supplied to a hole detection circuit 128 through an amplifier 126. In this embodiment, even if a hole 96 or a folded portion 98 is present in the bank note 2, as shown in FIG. 2, erroneous operation caused by a large change in amount of light reflected by or transmitted through the bank note can be prevented. The hole detection circuit 128 detects the presence/absence of a hole (including a folded portion) in accordance with the amount of light transmitted through the bank note 2. A hole detection signal is supplied to a gate 130 and a delay circuit 132. The gate 130 also receives an output from the amplifier 126, so that the gate 130 is closed in response to the hole detection signal. An output from the gate 130 is supplied to a judging circuit 134. The delay circuit 132 delays the hole detection signal by the time duration for conveying the bank note from the detection position of the first detection 112 to the detection position of the second detector 114. A delayed signal is then supplied to a gate 136, thereby closing the gate 136. The hole detection signal is also delayed by the time duration for conveying the bank note from the detection position of the first detector 112 to the detection position of the third detector 120. The resultant delayed signal is supplied to a gate 138, thereby closing the gate 138. The gates 136 and 138 also receive output signals from the second and third detectors 114 and 120 through amplifiers 140 and 142. Outputs from the gates 136 and 138 are also supplied to the judging circuit 134.

The operation of this embodiment will be described hereinafter. A case will first be explained wherein no hole and folded portion are formed in a bank note. In this case, the gates 130, 136 and 138 are not closed. The outputs (i.e., the transmission signal, the signal representing the light reflected from the lower side of the conveyed note, and the signal representing the light reflected from the upper side of the conveyed note) from the first, second and third detectors 112, 114 and 120 and supplied to the judging circuit 134. The judging circuit 134 compares these signals with different reference signals, respectively. In accordance with the comparison results, the bank note is detected as a fit/unfit note.

However, when a hole or a folded portion is formed in the bank note, an output from the first detector 112 is abnormally increased, Upon detection of this abnormal signal from the first detector 112, the hole detecting circuit 128 generates a hole detection signal. The gate 130 is immediately closed. When the bank note is then moved to the detection position of the second detector 114, the gate 136 is closed. When the bank note is finally moved to the detection position of the third detector 120, the gate 138 is closed. The time interval for closing the gates corresponds to the generation time of the hole detection signal. As a result, a signal representing a portion including the hole or the folded portion among the outputs from the first, second and third detectors 112, 114 and 120 will not be supplied to the judging circuit 134. In other words, the soiling of the bank note is detected in accordance with the reflected light signal excluding a signl component representing an abnormally high transmittance.

According to this embodiment as described above, a hole need not be considered in soiling detection. Therefore, a bank note discriminating apparatus can be obtained to accurately discriminate a fit note from an unfit note.

The present invention is not limited to the particular embodiment described above. Various changes and modifications may be made within the spirit and scope of the invention. For example, the reflected light detector and the transmission light detector arrangements need not be as in the above embodiment. There can be other arrangements. In addition, the sheet was exemplified by a bank note in the above description but is not limited to this.

According to the present invention, a sheet discriminating apparatus can be obtained wherein soiling of the sheet is accurately detected.

What is claimed is:

1. A sheet discriminating apparatus comprising:

means for detecting light having interacted with a sheet upon irradiation of light onto the sheet;

hole-detecting means for detecting whether or not there is a hole in the sheet, on the basis of an output of the light-detecting means, said hole-detecting means generating a hole-detection signal when a hole is detected in the sheet;

means for gating the output of the light-detecting means in accordance with the hole-detection signal; and means for detecting the degree of soil of the sheet in accordance with an output of the gating means.

2. A sheet discriminating apparatus according to claim 1, in which said hole-detecting means judges that the sheet has a hole in it when a change in the amount of detected light exceeds a predetermined value.

3. A sheet discriminating apparatus according to claim 1, in which said sheet is conveyed along a conveyor path, and said gating means receives an output from said detecting means and is opened/closed in response to the hole-detection signal, said gating means being closed, to stop transmitting an output component included in the output from said light-detecting means and corresponding to the presence of a hole.

4. A sheet discriminating apparatus according to claim 3, in which said light-detecting means is comprised of first to third detectors, arranged along the conveyor path, in order to detect the amount of transmission light, the amount of light reflected by the reverse side of the sheet and that reflected by the obverse side of the sheet, respectively; said gate means comprising first to third gates for receiving outputs of the first to third detectors, respectively; and the hole-detection signal is supplied to second and third gates after a time delay determined by the interval between the first and second detectors and that determined by the interval between the first and third detectors, respectively.

* * * * *